United States Patent [19]

Sekido et al.

[11] Patent Number: 4,485,191

[45] Date of Patent: Nov. 27, 1984

[54] CATALYSTS FOR CONVERTING REDUCTIVE AND OXIDATIVE GASES IN EXHAUST GASES INTO INNOXIOUS GASES

[75] Inventors: Satoshi Sekido, Yawata; Hirokazu Tachibana, Fushimi; Yoshito Ninomiya, Hirakata, all of Japan

[73] Assignee: Matsushita Electric Industrial Co., Ltd., Osaka, Japan

[21] Appl. No.: 474,339

[22] Filed: Mar. 11, 1983

[30] Foreign Application Priority Data

Mar. 12, 1982 [JP] Japan .................................. 57-39797

[51] Int. Cl.³ ...................... B01J 23/10; B01J 23/78; B01J 23/84; B01J 23/86
[52] U.S. Cl. .................................. 502/303; 502/525; 502/527; 423/213.5
[58] Field of Search ....................... 502/303, 525, 527; 423/213.5

[56] References Cited

U.S. PATENT DOCUMENTS

| | | | |
|---|---|---|---|
| 3,905,918 | 9/1975 | Mai et al. | 502/525 |
| 4,083,905 | 4/1978 | Insley et al. | 502/527 |
| 4,119,701 | 10/1978 | Fedor et al. | 502/527 |
| 4,151,123 | 4/1979 | McCann | 502/525 |

OTHER PUBLICATIONS

David W. Johnson et al., "Preparation of High Surface Area Substituted LaMnO₃ Catalysts," *Ceramic Bulletin*, vol. 55, No. 5, (1976), pp. 520–523, 527.

Teiji Nakamura et al., "Catalytic Activities of Perovskite-Type Compounds for Oxidation Reactions," 1980, The Chemical Society of Japan, No. 11, pp. 1679–1684.

*Primary Examiner*—W. J. Shine
*Attorney, Agent, or Firm*—Lowe King Price & Becker

[57] ABSTRACT

A catalyst for converting harmful reductive and oxidative gases in exhaust gases into innoxious gases is provided. The catalyst essentially consists of a perovskite oxide represented by the general formula $$La_{(1-x)/2}Sr_{(1+x)/2}Co_{1-x}Me_xO_3$$

in which Me is an element such as Fe, Mn, Cr, V or Ti and x is a number of from 0.15 to 0.90. In order to fabricate durable catalysts, the catalytic component is supported on heat-resistant expanded metal or inorganic fiber meshworks or hollows cylinders of heat-resistant anti-corrosion metals or refractory materials with or without catalyst-bearing pellets.

12 Claims, 10 Drawing Figures

CATALYSTS FOR CONVERTING REDUCTIVE AND OXIDATIVE GASES IN EXHAUST GASES INTO INNOXIOUS GASES

FIELD OF THE INVENTION

This invention relates to the catalytic conversion of harmful gases in exhaust gases into innoxious gases and more particularly, to catalysts useful in such conversion.

DESCRIPTION OF THE PRIOR ART

For the treatment of exhaust gases, a number of catalysts have been proposed including relatively inexpensive perovskite compound oxides such as $La_{0.5}Sr_{0.5}MnO_3$ and $La_{0.8}Sr_{0.2}CoO_3$. These oxide catalysts have the advantage that their catalytic activity is as high as the activity of noble metal catalysts which are much more expensive. However, the known perovskite oxide catalysts have been used to treat only reductive gas components such as CO, hydrocarbons and the like in exhaust gases. No attempts have been made to treat oxidative gases such as $NO_x$ with perovskite oxide catalysts. In addition, when exposed to a reductive gas atmosphere of high temperatures over a long duration, the known perovskite oxide catalysts undergo structural changes, resulting in lowering of catalytic activity without returning to an original level of activity. Thus, reliable catalytic operations cannot be expected.

In recent years, three-component catalytic systems for use in automobiles have been developed, in which it is essential that reductive and oxidative gases be present in equimolar amounts. This requires proper control of combustion with limitation in use. Moreover, these systems make use of noble metals which involve problems such as deterioration of the metals under high temperature conditions and their high costs. Accordingly, the systems have not become popular yet.

Moreover, stainless steel nettings or gauzes are, in some cases, used as a catalyst for combustion apparatus for domestic purposes. However, it is difficult to treat reductive and oxidative gases at the same time, coupled with another disadvantage that the nettings themselves are oxidized and thus deteriorate when placed under high temperature conditions.

SUMMARY OF THE INVENTION

It is accordingly an object of the present invention to provide catalysts which are highly effective in converting harmful gases of exhaust gases into innoxious gases.

It is another object of the invention to provide catalysts for converting harmful reductive and oxidative gases into innoxious gases which have specific types of supports or carriers by which they can exhibit long stable catalytic activity.

It is a further object of the invention to provide catalysts by which reductive and oxidative gases can be treated at the same time.

The above objects can be achieved, according to one embodiment of the present invention, a catalyst which essentially consists of a perovskite oxide represented by the general formula $$La_{(1-x)/2}Sr_{(1+x)/2}Co_{1-x}Me_xO_3$$

in which Me is an element selected from the group consisting of Fe, Mn, Cr, V and Ti and x is a number of from 0.15 to 0.90.

Perovskite compound oxides are generally represented by the formula, $ABO_3$. In this sense, A site of the perovskite compound oxide according to the invention consists of La and Sr and B site thereof consists of Co and a defined metal. This type of perovskite compound oxide has the capability of oxidation of reductive gases and decomposition reduction of oxidative gases at the same time. When the ratios of the component elements are within ranges defined above, the catalytic activity becomes sufficiently high. Substitution of Co with the Me element in B site of the compound enables the compound to be very stable against reductive atmospheres, ensuring high stability in catalytic activity. The perovskite oxide catalyst of the invention utilizes oxidation and reduction reactions of the oxide itself. The oxide will yield oxygen to reductive gases and the oxide itself will be in turn reduced. Once reduced oxide takes therein oxygen from oxidative gases or from the air and is re-oxidized. Stable catalytic activity of the oxide is largely attributed to repetition of the above reduction and re-oxidation process. It is believed that substitutions in A and B sites bring about a great effect on the oxygen-yielding and receiving ability of the oxide itself. Because of this ability, even though reductive and oxidative gases in exhaust gases are not present in equimolar amounts, these exhaust gases can suitably be treated by reaction with the oxide.

The perovskite oxides themselves may be shaped in any desired forms including pellets, spheres, tubes or hollow cylinders and the like. It is favorable from the viewpoints of economy and life that the oxides are supported on carriers. Carriers should satisfy the following requirement; perovskite oxides are hard to come off when exposed to high temperatures. Otherwise, stable catalytic activity cannot be attained. For this purpose, specific types of carriers are used and are made of heat-resistant anti-corrosion metal materials such as austenite stainless steels, nichrome, berylium bronze, various other stainless steels and the like, and refractory materials including alkaline earth metal oxides such as magnesia, calcium oxide, strontia and the like, amphoteric oxides such as silica, alumina, acidic oxides and the like. Of these, austenite metal materials, alkaline earth metal oxides and amphoteric oxides are preferable. Carriers may take any forms usually employed for this purpose.

DETAILED DESCRIPTION AND EMBODIMENTS OF THE INVENTION

Figure 1:
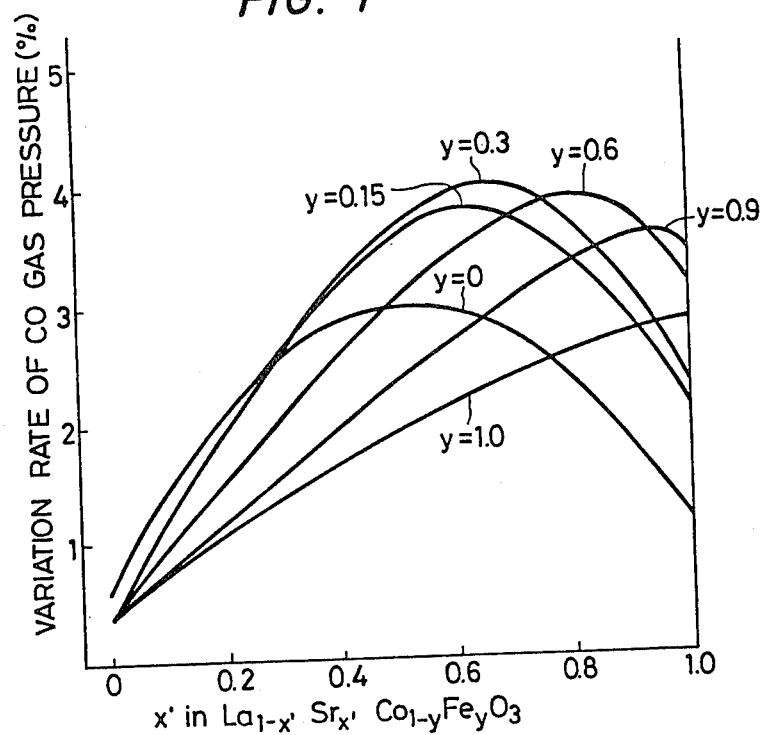
FIG. 1 is a graphical representation of a variation by percent of CO gas in relation to variation of $x'$ in $La_{1-x'}Sr_{x'}Co_{1-y}Fe_yO_3$ for different values of y.

As described hereinabove, the catalyst according to the present invention essentially consists of a perovskite oxide of the formula $$La_{(1-x)/2}Sr_{(1+x)/2}Co_{1-x}Me_xO_3$$

in which Me is an element such as Fe, Mn, Cr, V and Ti and x is a number of from 0.15 to 0.90. The oxide catalyst per se may be suitably shaped in desired forms such as pellets, hollow cylinders, spheres and the like. In this connection, it is usual to support catalytic components on a carrier. Favorably, a netting or meshwork on which a perovskite oxide catalyst of the invention is deposited is used. The meshwork is preferably made of heat-resistant anti-corrosion metal materials or inorganic refractory fiber materials such as silica and alumina as mentioned hereinbefore. A heat-resistant anti-corrosion metal meshwork is usually used as expanded so as to deposit the oxide catalyst in larger amounts. Typical and preferable metal materials useful for the above purpose include austenite metals such as stainless steel SUS 316 which has a coefficient of expansion similar to the perovskite oxide of the aforeindicated formula. This is very advantageous in that once deposited oxide catalyst is held firmly on an expanded metal support even when exposed to high temperatures at which exhaust gases are treated. Inorganic fiber materials are likewise used with similar results. In general, an expanded metal or inorganic fiber meshwork is arranged to have a size of 5 to 100 mesh for efficiently treating exhaust gases in practical applications without impeding smooth flow or passage of combustion exhaust. In the case using the above-mentioned type of meshwork, a perovskite oxide catalyst is usually deposited on the meshwork in a thickness of 100 to 500 microns though the thickness or amount of deposition may largely vary depending on the treating temperature and time, flow rate and kind of gas being treated, and the like.

A perovskite oxide catalytic component can be deposited on a support in desired amounts by dissolving predetermined amounts of water-soluble salts of component metals such as acetates, nitrates, oxalates and the like in pure water and, for example, immersing the support in the solution. The immersed support is then subjected to thermal decomposition of the salts in air at about 400° to 500° C. for 1 to several hours. The above procedure is repeated several times to deposit a desired amount of an intended perovskite oxide on support. Finally, the oxide on support is sintered in air at about 1100° C. for a time sufficient for the sintering, say, about 4 hours. A plurality of deposited meshworks may, of course, be used for treatment of exhaust gases, if necessary. It will be noted that instead of using a solution of water-soluble salts, a dispersion of component metal oxides may likewise be used. Also, flame coating may be used for deposition of perovskite compound oxide on support.

In the above embodiment, metal or inorganic fiber meshworks are used as a support. Pellets of inorganic materials such as alumina, silica and other usually employed materials may also be used as a support on which the oxide catalyst is deposited in desired amounts though pellets per se may be made of a perovskite oxide of the invention. These pellets are, in the simplest way, placed on at least one wire gauze tray which has a shape adapted to be snugly mounted in a path of exhaust gas being treated. Usually, the pellets are sandwiched between two or more meshworks to fixedly keep the pellets therein.

Alternatively, the support may be in the form of a hollow cylinder or tube. In order to permit full catalytic activity of perovskite oxides using a hollow cylinder or tube, the cylinder is made of a porous material and is densely packed in pores thereof with a perovskite oxide until it becomes impermeable to gas. The dense packing can be realized by impregnating a solution of salts of desired metals for an intended perovskite oxide in vacuo in the cylinder, followed by sintering under conditions described with respect to meshwork. Thus, a catalyst-bearing hollow cylinder can be fabricated. This type of catalyst-bearing hollow cylinder should preferably be used in such a way that either an inner or outer surface of the cylinder is exposed to air with the other surface being exposed to an exhaust gas being treated for reasons discussed hereinafter. In order to further improve the efficiency of treatment of exhaust gases, pellets on which the oxide catalyst is deposited are filled in the hollow cylinder through which an exhaust gas is passed. Alternatively, the hollow cylinder may have a honeycomb structure having a number of throughholes by which the treating efficiency can be improved.

The present invention is particularly described by way of examples.

EXAMPLE 1

This example illustrates the activity of oxide catalysts represented by the formula, $La_{1-x'}Sr_{x'}Co_{1-y}Fe_yO_3$.

Oxides or carbonates of metals were mixed in such amounts as to give intended perovskite oxide compositions and sintered to obtain compound oxides. Each oxide was molded into cylindrical pellets each having a weight of 1 g and sintered. Four catalyst pellets were placed in a reactor container of a constant volume, into which was flowed a mixed gas, adjusted to atmospheric pressure, of 100 ppm of CO, 5% of $O_2$ and the balance of $N_2$ to allow the gas to contact with the catalyst for 1 minute. Thereafter, the pressure of the gas in the container was measured to determine a percent variation of the pressure. This percent variation was defined as a catalytic activity. During the test, the temperature was maintained at 300° C. The results are shown in FIG. 1.

The results reveal that the percent variation becomes highest at x'=0.5 in case where y=0, at x'=0.575 in the case of y=0.15, at x'=0.65 in case of y=0.3, at x'=0.8 in case of y=0.6, at x'=0.95 in the case of y=0.9 and at x=1.0 in case y=1.0. Moreover, it will be seen that the catalytic activity increases when the amounts of substituted Sr and Fe increase.

The oxide compositions whose activity becomes highest in the curves of FIG. 1 include $La_{0.5}Sr_{0.5}CoO_3$, $La_{0.425}Sr_{0.575}Co_{0.85}Fe_{0.15}O_3$, $La_{0.35}Sr_{0.65}Co_{0.7}Fe_{0.3}O_3$, $La_{0.2}Sr_{0.8}Co_{0.4}Fe_{0.6}O_3$, $La_{0.05}Sr_{0.95}Co_{0.1}Fe_{0.9}O_3$ and $SrFeO_3$. In $LaCoO_3$, Co is present as a trivalent ion. However, when La in A site is replaced by $Sr^{2+}$, $Co^{4+}$ appears. Assuming that Fe which is substituted with Co in B site serves as a tetravalent ion, $Co^{3+}$ and $Co^{4+}$ will be present in equivalents from the standpoint of electrical neutrality in the case of the above-mentioned Co-containing oxides. In other words, the substitutions in A and B sites should be determined so that $Co^{3+}$ and $Co^{4+}$ are present in equivalents, by which high catalytic activity can be insured. For this purpose, the oxide catalyst can be represented by the formula, $La_{(1-x)/2}Sr_{(1+x)/2}Co_{1-x}Me_xO_3$ in which Me is an element defined before.

With regard to the value of x, a significant difference in catalytic activity appears when x is in the range of 0.15 to 0.90. This is illustrated in the following example.

EXAMPLE 2

This example illustrates treatment of a mixed gas containing reductive and oxidative gases.

Figure 2:
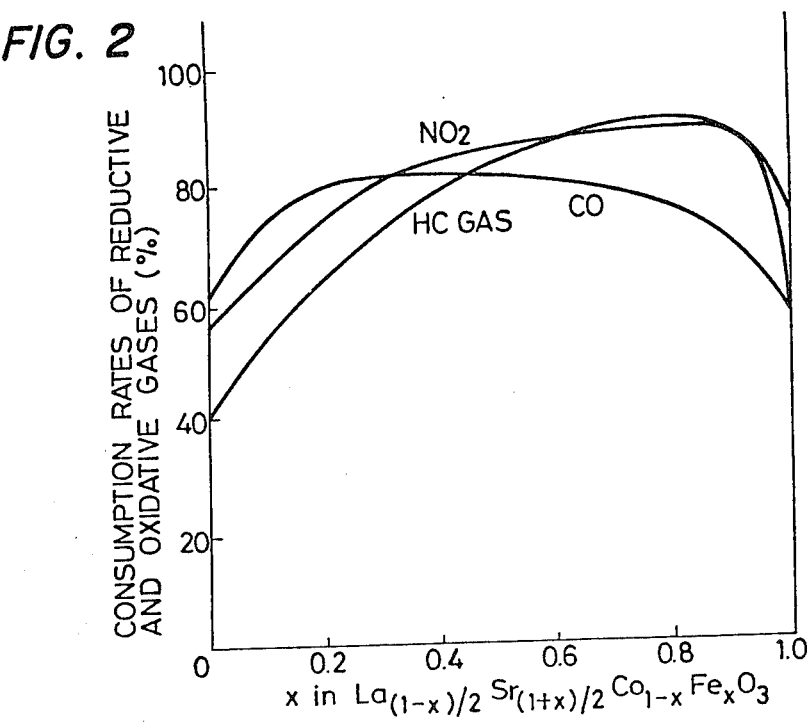
FIG. 2 is a graphical representation of the relation between the reduction rate and the variation of x in $La_{(1-x)/2}Sr_{(1-x)/2}Co_{1-x}(Fe_xO_3$ for different reductive and oxidative gases.

45 pellets of each catalyst prepared in the same manner as in Example 1 were placed in a quartz tube having an inner diameter of 20 mm, followed by securing it to an electric furnace so as to keep at a constant temperature of 600° C. A uniform mixed gas of 50 ppm of hydrocarbon gas, 50 ppm of CO, 50 ppm of $NO_2$ and the balance of $N_2$ was fed to the catalyst bed. When the gas feed reached a stationary state, concentrations of the respective gases at the outlet was measured to determine their reduction rates. The results are shown in FIG. 2.

From the figure, it will be seen that for CO gas, the reduction rate becomes maximum at x=0.15 to 0.2. For HC and $NO_2$, the reduction rates become higher at x=0.8 to 0.9. Accordingly, x is favorably in the range of 0.15 to 0.90 though smaller values may be used.

Perovskite compounds oxides of the invention can properly be used depending on the type of exhaust gas being treated. That is, if an exhaust contains a relatively high content of CO gas, a perovskite oxide of the aforeindicated formula in which x is in the range of 0.15 to 0.2 or thereabouts is used. On the contrary, if an exhaust contains relatively high contents of $NO_2$ and HC gases, a perovskite oxide of the formula in which x has a higher value of about 0.8 to 0.9 is preferably used.

EXAMPLE 3

This example illustrates catalytic activity of perovskite oxides represented by $La_{0.35}Sr_{0.65}Co_{0.7}Me_{0.3}O_3$ in which Me=Fe, Mn, Cr, V and Ti.

In the same manner as in Examples 1 and 2, catalyst pellets having different compositions were prepared. 40 pellets of each oxide were filled in a quartz tube with an inner diameter of 20 mm and the tube was set in an electric furnace to keep the temperature at 300° C. Thereafter, a uniform mixed gas of 150 ppm of CO, 50 ppm of $NO_2$ and the balance of $N_2$ was flowed into the catalyst bed. When the gas feed reached a stationary state, concentrations of the individual gases were measured to determine their reduction rates based on those in the feed gas.

Furthermore, in order to determine the catalytic stability of each oxide, 40 pellets of each oxide were placed between two round heat-resistant anti-corrosion wire meshworks having a diameter of 120 mm. The meshworks were placed on the upper portion of a combustion cylinder of a portable gas stove and subjected to 1000 combustion cycles, one cycle including the following procedure: the gas stove was heated for 30 minutes and then turned off for 30 minutes. When heated, the catalyst bed had a temperature of about 700° C. The measurement of catalytic activity was performed every 1000 cycles until 5000 cycles was reached.

Figure 3:
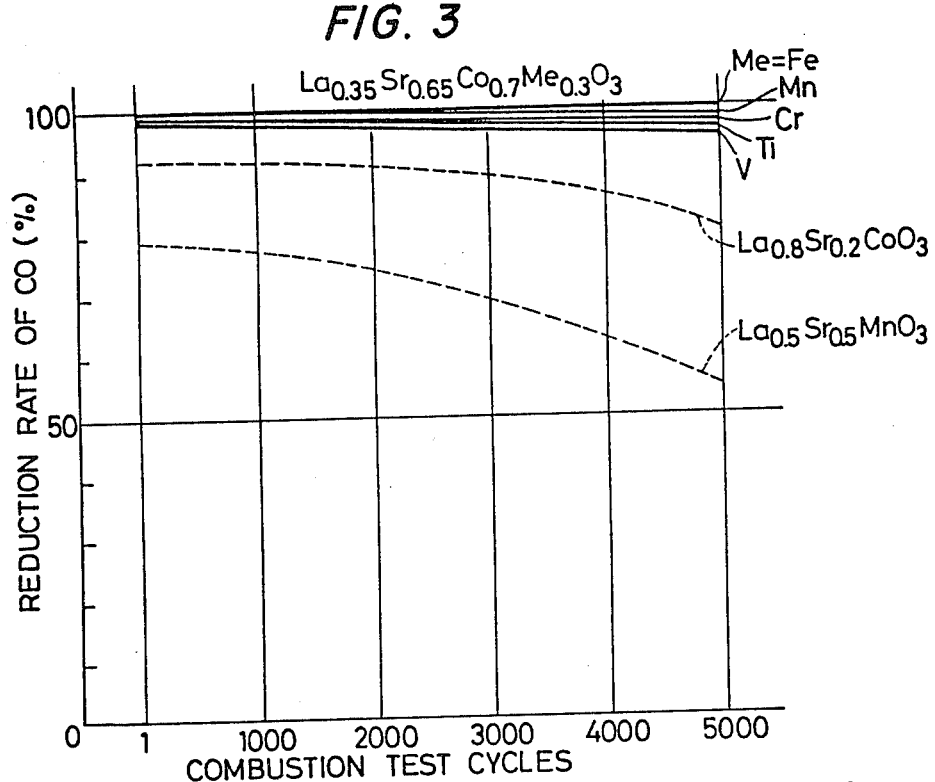
FIG. 3 is a graphical representation of a percent reduction of CO gas in relation to the number of combustion cycles for different perovskite oxides.
Figure 4:
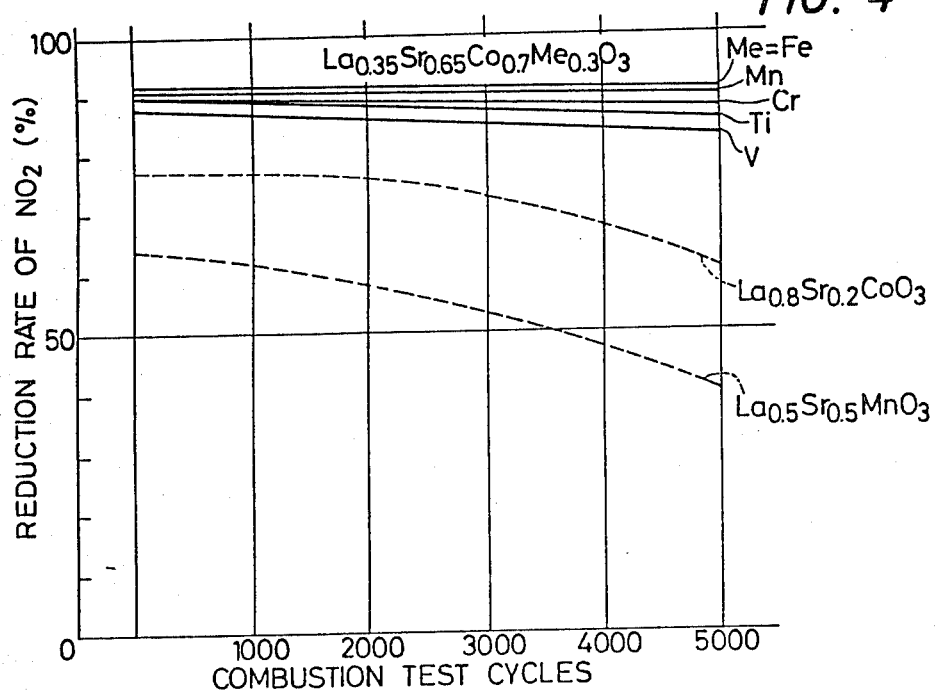
FIG. 4 is similar to FIG. 3 but using $NO_2$ gas.

For comparison purposes, $La_{0.5}Sr_{0.5}MnO_3$ and $La_{0.8}Sr_{0.2}CoO_3$ were prepared in the form of pellets and tested. The results are shown in FIGS. 3 and 4 in which reduction rates of CO and $NO_2$ are shown, respectively. These results demonstrate that the oxide catalysts of the present invention are significantly higher than the comparative oxide catalysts and that the catalytic activity of the oxide catalysts of the present invention does scarcely lower even after 5000 combustion cycles. The comparative oxide catalysts are inferior to those of the present invention with respect to both the catalytic activity and the stability. Substitution in B site is believed to produce a significant effect on the catalytic activity and stability.

EXAMPLE 4

This example illustrates a catalytic system for treatment of an exhaust gas in which perovskite oxides are deposited on an expanded metal meshwork of stainless steel SUS 316.

$La_{0.35}Sr_{0.65}Co_{0.7}Fe_{0.3}O_3$ was deposited on an expanded metal meshwork of stainless steel SUS 316 as follows. The meshwork had a round shape having a diameter of 120 mm with an expanded metal width of 1 mm. Predetermined amounts of acetates of the respective component metals were dissolved in pure water. The meshwork whose surface had been cleansed was immersed in the aqueous solution, followed by thermal decomposition at 400° C. for 1 hour in air. The immersion and thermal decomposition procedure was repeated several times, after which the deposited meshwork was subjected to sintering at 1100° C. for 4 hours in air thereby fixedly depositing the compound oxide on the meshwork. The above procedure was repeated using manganese acetate instead of iron acetate thereby obtaining a compound oxide-deposited meshwork. In both cases, the compound oxides were deposited in an amount of about 0.8 g in total.

Figure 5:
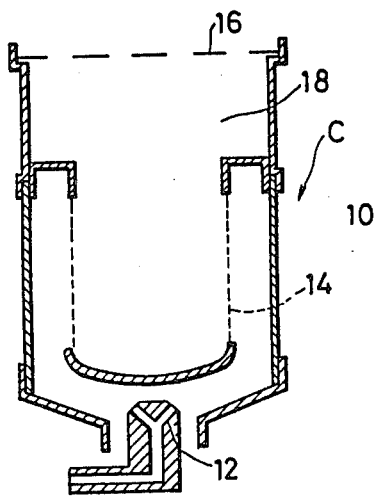
FIG. 5 is a schematic sectional view of a gas stove in which a meshwork support on which a perovskite oxide of the present invention is deposited is mounted.

These meshworks were mounted on an upper portion of a combustion cylinder of a commercially available stove for city gas in a manner as shown in FIG. 5. In FIG. 5, there is shown a combustion cylinder C which includes an outer cylindrical wall 10 and an inner perforated combustion portion 12 united to the wall 10 as usual. A gas burner 14 is provided at the bottom of the combustion cylinder C. At the top of the cylindrical wall 10 is set a meshwork 16. An exhaust gas generated at the inner combustion cylinder 12 flows toward the meshwork 16 through a path 18 where reductive and oxidative gases in the exhaust are treated and discharged in the air.

The two meshworks were tested for their catalytic activity while heating the stove. Upon combustion, the temperature in a portion below the meshwork was about 700° C.

For comparison, a compound oxide-free meshwork itself was used for the test.

The test results are shown in Table 1 below.

TABLE 1

|  | CO (ppm) | | NO$_2$ (ppm) | |
| --- | --- | --- | --- | --- |
|  | Before Passage Through Meshwork | After Passage Through Meshwork | Before Passage Through Meshwork | After Passage Through Meshwork |
| La$_{0.35}$Sr$_{0.65}$Co$_{0.7}$Fe$_{0.3}$O$_3$ on SUS 316 Meshwork | 27–30 | 6–8 | 1.3–1.4 | 0.18–0.21 |
| La$_{0.35}$Sr$_{0.65}$Co$_{0.7}$Mn$_{0.3}$O$_3$ on SUS 316 Meshwork | " | 8–10 | " | 0.22–0.24 |
| Comparative SUS 316 Meshwork | " | 20–25 | " | 0.72–0.75 |

The results of the table reveal that the compound oxides of the present invention are very effective when deposited on the expanded metal meshwork.

In the above example, the expanded SUS 316 meshwork was used but similar results were obtained using other heat-resistant metals such as nichrome, berylium bronze, various other stainless steels including martensite and ferrite stainless steels and the like. Also, similar results are obtained when inorganic fiber meshworks such as of alumina, silica and the like were used.

Figure 6:
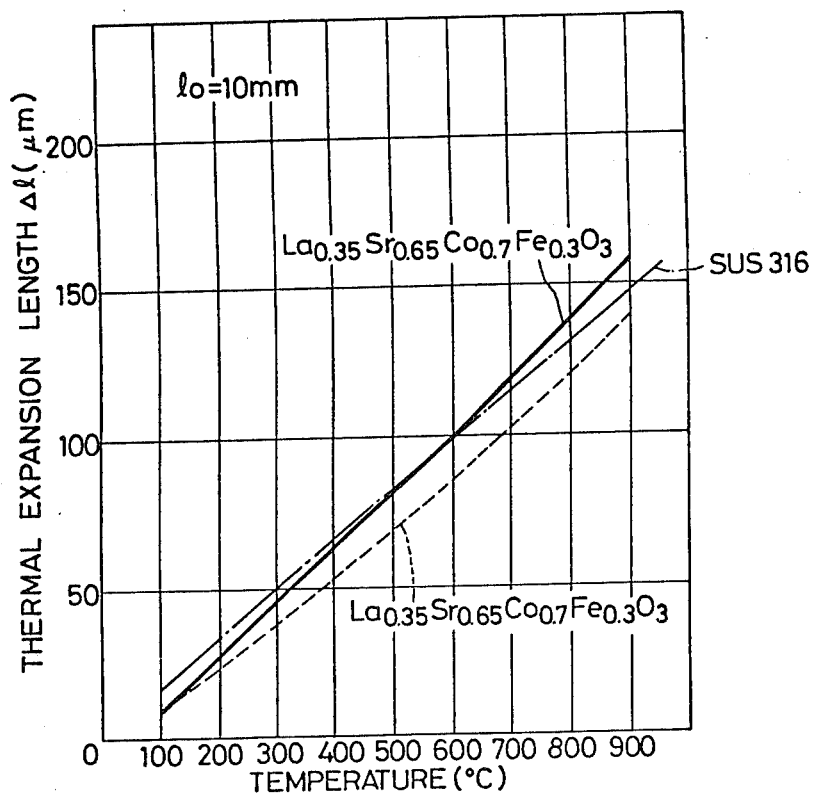
FIG. 6 is a graphical representation of a thermal expansion in relation to temperature for two perovskite oxides of the invention and stainless steel SUS 316.

In FIG. 6, there is shown the relation between the thermal expansion, 1 (microns), per 10 mm length, $1_o$ and the temperature for stainless steel SUS 316 and perovskite oxides of the invention, i.e. La$_{0.35}$Sr$_{0.65}$Co$_{0.7}$Fe$_{0.3}$O$_3$ and La$_{0.35}$Sr$_{0.65}$Co$_{0.7}$Mn$_{0.3}$O$_3$. From the figure, it will be seen that these compound oxides are thermally expanded in a manner close to the stainless steel over a wide range of temperature. Accordingly, the stainless steel SUS 316 meshwork on which perovskite compound oxides of the present invention are deposited will insure stability over a long time duration from thermal and mechanical standpoints.

EXAMPLE 5

The three meshworks of Example 4 were each mounted in a gas stove of the same type as used in Example 4 and subjected to the combustion cycle test of 5000 cycles in total in which each cycle involved heating of the stove for 30 minutes and turning-off thereof for 30 minutes. Concentrations of CO and NO$_2$ in the exhaust after passage through the meshwork were measured after every one cycle and every 1000 cycles together with the weight of the respective compound oxide deposited on the meshwork.

Figure 7A:
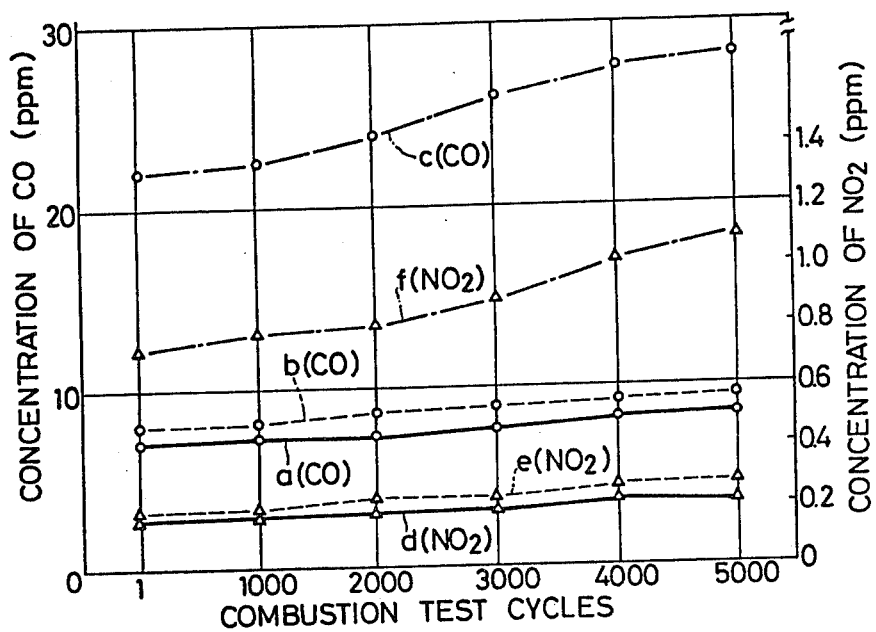
FIG. 7(a) is a graphical representation of concentrations of CO and $NO_2$ gases in relation to the number of combustion cycles for different test samples and FIG. 7(b) is a graphical representation of amounts of perovskite oxides deposited on the test samples used in FIG. 7(a) in relation to the number of combustion cycles.
Figure 7B:
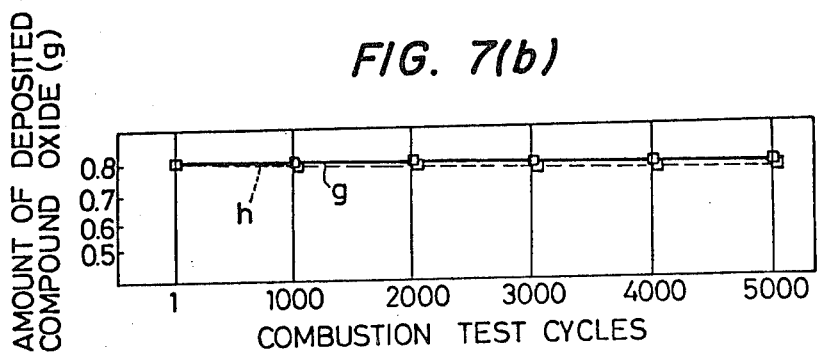

The results are shown in Tables 7(a) and 7(b). In FIG. 7(a), curves a, b and c correspond to the wire meshworks which deposit thereon the Fe- and Mn-containing perovskite compound oxides of the present invention and the comparative meshwork, respectively, for CO concentration. Curves d, e and f likewise correspond to the meshworks deposited with the Fe- and Mn-containing perovskite oxides and the comparative wire meshwork, respectively, for NO$_2$ concentration. In FIG. 7(b), curves g and h correspond to the Fe- and Mn-containing perovskite oxides, respectively.

It will be noted that CO and NO$_2$ concentrations prior to passage through the meshwork are those indicated in Table 1 and the temperature of an exhaust is about 700° C. just before contact with the meshwork.

As will become apparent from the results of Table 7(a) and Table 1, the wire meshworks having thereon Fe- or Mn-containing perovskite oxide of the invention are very excellent in initial efficiency of converting reductive and oxidative gases into harmless gases. Also, this efficiency is kept almost constant even when the combustion cycle is repeated 5000 times. This is considered partly due to the fact that because these compound oxides exhibit almost the same thermal expansion as the substrate, they hardly come off when subjected to the combustion cycles and partly due to the fact that deposition of the compound oxides can prevent the wire meshwork from deteriorating by oxidation.

As a matter of course, a plurality of deposited wire meshworks may be used in combination. The meshwork may be shaped in various forms, if desired.

EXAMPLE 6

This example illustrates pellets of perovskite compound oxide catalyst which are sandwiched between heat-resistance anti-corrosion wire meshworks. In this example, La$_{0.35}$Sr$_{0.65}$Co$_{0.7}$Fe$_{0.3}$O$_3$ is used as a catalytic component.

Acetates of component metals were dissolved in pure water in predetermined amounts and were impregnated in alumina spheres having a diameter of 3 mm and a porosity of about 60%. After thermal decomposition at 400° C., the impregnated spheres were sintered in air at 1100° C. for 3 hours to obtain catalyst-bearing pellets. 50 g of the pellets were placed between two stainless steel SUS 316 nettings with a round form having a diameter of 120 mm. For comparison, 1 wt% Pt was deposited on alumina spheres, which were placed between the SUS 316 nettings.

Figure 8:
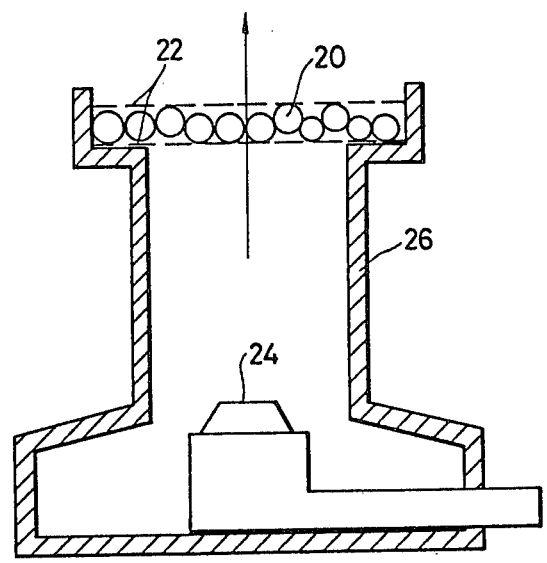
FIG. 8 is a schematic sectional view of a combustion apparatus mounted with a catalyst according to the invention.

These netting devices were each set in a combustion portion of a combustion apparatus as schematically shown in FIG. 8. In FIG. 8, indicated by 20 are pellets, by 22 is a SUS 316 meshwork, by 24 is a burner, and by 26 is a flow path of an combustion exhaust gas from the burner 24.

Prior to subjecting the catalysts to an actual combustion test using the device of FIG. 8, a mixed gas of 100 ppm of CO, 55 ppm of NO$_2$ and the balance of N$_2$ was passed through each device at a flow rate of 10 l/min at a temperature of the catalyst bed of 700° C. to determine gas concentrations after passage through the catalyst bed. The results are shown in able 2 below.

TABLE 2

|  | CO (ppm) | NO$_2$ (ppm) |
| --- | --- | --- |
| SUS 316 + Perovskite Oxide-bearing Pellets of Invention | 15–17 | 6–8 |
| SUS 316 + Pt-bearing Pellets for Comparison | 33–37 | 15–18 |
| SUS 316 alone for Comparison | 64–72 | 23–27 |

A bunsen burner was used to effect a combustion test using city gas. Concentrations of CO and NO$_2$ in an exhaust gas prior to and after passage through the catalysts used above are shown in Table 3.

TABLE 3

| | CO (ppm) | | NO₂ (ppm) | |
| --- | --- | --- | --- | --- |
| | Prior to Passage Through Catalyst | After Passage Through Catalyst | Prior to Passage Through Catalyst | After Passage Through Catalyst |
| SUS 316 + Perovskite Oxide-bearing Pellets | 28-30 | 7-9 | 1.2-1.3 | 0.9-0.22 |
| SUS 316 + Pt Bearing-Pellets for Comparison | " | 11-15 | " | 0.46-0.50 |
| SUS 316 alone for Comparsion | " | 20-24 | " | 0.63-0.71 |

As will become apparent from the results of Tables 2 and 3, the catalyst device of the present invention is very effective in converting noxious gases into innoxious ones. Higher efficiency would readily be attained without impairing combustion condition when various factors such as a size of pellets, a manner of arrangement of the device, the number of nettings and the like would properly be controlled.

EXAMPLE 7

Figure 9:
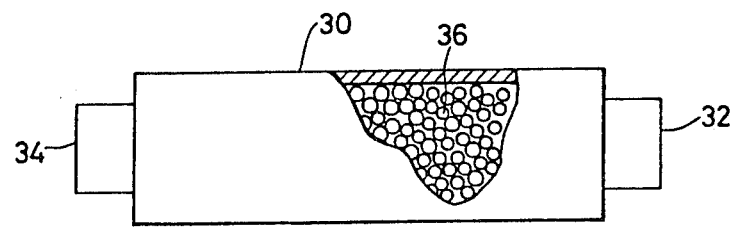
FIG. 9 is a schematic view, partially in section, of a hollow cylinder in which perovskite oxide-bearing pellets are filled.

This example illustrates a further embodiment of the invention using a tube or cylinder. This embodiment is schematically shown in FIG. 9, in which there is shown a hollow cylinder or tube 30 having an inlet 32 and an outlet 34 for exhaust gas. Catalyst-bearing pellets 36 are filled in the cylinder 30. The cylinder 30 is formed from a perovskite oxide per se or a porous sintered body such as of alumina on which the oxide catalyst is supported. The cylinder is exposed to the air on the outer surface thereof. An exhaust gas from the inlet 32 is treated with the catalyst on the inner surface of the cylinder 30 and the pellets 36, and discharged from the outlet 34.

The hollow cylinder 30 alone may be sufficient for treatment of an exhaust gas. The reason why pellets of perovskite oxide per se or perovskite oxide-bearing pellets are filled in the hollow cylinder is that equimolar amounts of reductive and oxidative gases are reacted on the pellets and an additional or remaining reductive or oxidative gas is reacted on the catalytic surface of the hollow cylinder. Moreover, where an exhaust gas is passed in large amounts, it will cause turbulent flow upon passage through the pellets, permitting sufficient contact with the catalyst.

Instead of using the pellets, the hollow cylinder may be shaped to have a honeycomb structure so as to increase a surface area on which a catalyst is deposited. By this, an efficiency of contact of an exhaust gas with a catalyst increases, resulting in an increase of catalytic efficiency. This honeycomb structure is actually useful because a monolithic honeycomb cylinder can readily be fabricated.

A combination of a hollow cylinder with pellets is described using as a catalytic component $La_{0.35}Sr_{0.65}Co_{0.7}Fe_{0.3}O_3$.

Predetermined amounts of acetates of component metals for the above perovskite oxide were dissolved in distilled water. The resulting solution was impregnated in vacuo in an alumina tube, with an apparent porosity of about 15%, having an inner diameter of 30 mm, an outer diameter of 40 mm and a length of 300 mm. After thermal decomposition at about 400° C., the impregnated tube was sintered at 1100° C. for 3 hours to obtain a catalyst-bearing tube. This tube was impermeable to gas, i.e. the pores were fully filled with the compound oxide. Pellets on which a perovskite oxide with the same composition as used above was deposited were fabricated in the same manner as in the foregoing examples. 100 g of the catalyst-bearing pellets were charged in the tube to provide an exhaust treating device.

For comparison, alumina spheres on which 1 wt% of Pt was deposited were provided along with a quartz tube having the same inner diameter as the alumina tube. The quartz tube was used in combination with perovskite oxide-bearing pellets as well as the Pt-bearing alumina spheres.

These combinations were tested by passing a mixed gas of 1 vol% of CO, 0.5 vol% of NO and the balance of $N_2$ at a flow rate of 5 l/min. Concentrations of CO and NO in a discharged gas at the time when the stationary state was reached at 300° C. and 600° C. were measured. The results are shown in Table 4.

TABLE 4

| | 300° C. | | 600° C. | |
| --- | --- | --- | --- | --- |
| | CO (ppm) | NO (ppm) | CO (ppm) | NO (ppm) |
| Catalyst-bearing Tube + Compound Oxide Catalyst-bearing Pellets | 52 | 21 | 20 | 11 |
| Quartz Tube + Compound Oxide Catalyst-bearing Pellets for Comparison | 5110 | 114 | 5030 | 32 |
| Quartz Tube + Pt Catalyst-bearing Pellets | 5240 | 248 | 5070 | 73 |

From the above results, it will be seen that the catalytic activity of the catalyst-bearing cylinder having the pellets therein according to the invention is very high.

In this catalyst-bearing tube, the pores are filled with the compound oxide catalyst. In this manner, the tube becomes impermeable to gas. The outer surface of the tube is exposed to the air while the inner surface is contacted with the exhaust gas. The high catalytic activity is considered to be attributed to the interaction between oxygen in the air and reductive or oxidative gases in exhaust gas through the perovskite oxide on the inner surface. Thus, either inner or outer surface of the catalyst-bearing tube of the type described above should be exposed to air while the other surface is exposed to an exhaust gas being treated.

The tube and pellets may be formed from perovskite oxides per se. In this connection, especially when pellets are placed in a flow path of exhaust gas, conversion reactions are considered to occur, in most cases, in the vicinity of the surface layer of the pellets. Accordingly, it is economically advantageous that a catalytic component is supported on a carrier as shown in Examples. In fact, no appreciable difference between the tube or pellets of perovskite oxide per se and the tube or pellets supporting thereon perovskite oxide is recognized.

What is claimed is:

1. A catalyst for the conversion of reductive and oxidative gases in exhaust gases into innoxious gases, said catalyst essentially consisting of a perovskite oxide represented by the general formula

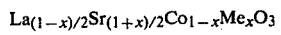

$$La_{(1-x)/2}Sr_{(1+x)/2}Co_{1-x}Me_xO_3$$

in which Me is an element selected from the group consisting of Fe, Mn, Cr, V and Ti and x is a number of from 0.15 to 0.90.

2. A catalyst according to claim 1, wherein said catalyst has a form of pellets.

3. A catalyst according to claim 1, further comprising a support for said perovskite oxide.

4. A catalyst according to claim 3, wherein said support is a heat-resistant anti-corrosion expanded metal meshwork.

5. A catalyst according to claim 3, wherein said support is an inorganic fiber meshwork.

6. A catalyst for the conversion of reductive and oxidative gases in exhaust gases into innoxious gases, said catalyst comprising pellets of a perovskite oxide represented by the general formula $$La_{(1-x)/2}Sr_{(1+x)/2}Co_{1-x}Me_xO_3$$

in which Me is an element selected from the group consisting of Fe, Mn, Cr, V and Ti and x is a number of from 0.15 to 0.90, and at least one heat-resistant netting mounting thereon said pellets and adapted to be disposed in a path of an exhaust gas being treated.

7. A catalyst according to claim 6, wherein said at least one netting is formed from material selected from heat-resistant anti-corrosion metal materials and inorganic refractory materials.

8. A catalyst for the conversion of reductive and oxidative gases in exhaust gases into innoxious gases, said catalyst comprising a molded hollow cylinder having at least on the surface thereof a perovskite oxide represented by the general formula $$La_{(1-x)/2}Sr_{(1+x)/2}Co_{1-x}Me_xO_3$$

in which Me is an element selected from the group consisting of Fe, Mn, Cr, V and Ti and x is a number of from 0.15 to 0.90, said cylinder adapted to pass therethrough an exhaust gas being treated whereby the exhaust gas is brought into contact with the perovskite oxide during the passage thereby converting reductive and oxidative gases of said exhaust gas into innoxious gases.

9. A catalyst according to claim 8, wherein said hollow cylinder is entirely made of the perovskite oxide.

10. A catalyst according to claim 8, wherein said hollow cylinder has a honeycomb structure.

11. A catalyst according to claim 8, wherein said hollow cylinder includes a porous ceramic cylinder having said perovskite oxide deposited on the surfaces and in pores thereof.

12. A catalyst according to claim 8, wherein said hollow cylinder includes therein pellets of the perovskite oxide or perovskite oxide-bearing pellets.

* * * * *

UNITED STATES PATENT AND TRADEMARK OFFICE
CERTIFICATE OF CORRECTION

PATENT NO. : 4,485,191
DATED : November 27, 1984
INVENTOR(S) : Satoshi Sekido et al It is certified that error appears in the above-identified patent and that said Letters Patent is hereby corrected as shown below:

Column 2, line 53, "$La_{(1-x)/2}Sr_{(1-x)/2}Co_{1-x}Fe_xO_3$", should be --$La_{(1-x)2}Sr_{(1+x)/2}Co_{1-x}Fe_xO_3$--.

Figure 5, line "14", should be --12--; line "12", should be 14 and an identifying line should be inserted at "10".

Figure 6, the lower bottom formula should be --$La_{0.35}Sr_{0.65}Co_{0.7}Mn_{0.3}O_3$--.

Figure 8, the identifying line at "26" should continue into the center.

Signed and Sealed this

Twenty-eighth Day of May 1985

[SEAL]

Attest:

DONALD J. QUIGG

Attesting Officer

Acting Commissioner of Patents and Trademarks